United States Patent [19]

Tiegel et al.

[11] 4,013,864

[45] Mar. 22, 1977

[54] APPARATUS FOR FABRICATING THROUGH-THE-WALL BATTERY CONNECTORS

[75] Inventors: Ernest G. Tiegel, Redwood City; Ralph G. Tiegel, San Carlos, both of Calif.

[73] Assignee: Tiegel Manufacturing Company, Belmont, Calif.

[22] Filed: Mar. 6, 1975

[21] Appl. No.: 555,883

Related U.S. Application Data

[63] Continuation-in-part of Ser. No. 753,137, Aug. 16, 1968.

[52] U.S. Cl. .................................. 219/80; 29/730; 29/430; 429/160; 219/79; 219/86; 219/119
[51] Int. Cl.² ................. B23K 19/00; H01M 10/12
[58] Field of Search ............ 29/204, 430; 136/176; 219/78, 79, 80, 86, 88, 90, 93, 94, 119, 120, 106, 107

[56] References Cited

UNITED STATES PATENTS

| 2,756,708 | 7/1956 | Tiegel | 29/204 |
|---|---|---|---|
| 3,427,424 | 2/1969 | Kirchberger et al. | 219/78 |
| 3,544,754 | 12/1970 | Buttke et al. | 219/79 |
| 3,547,183 | 12/1970 | Clingenpeel et al. | 136/176 X |
| 3,575,569 | 4/1971 | Mitchell, Jr. et al. | 219/78 X |
| 3,627,617 | 12/1971 | Schaumburg et al. | 136/176 X |
| 3,813,024 | 5/1974 | Kirchberger et al. | 29/204 X |

*Primary Examiner*—J. V. Truhe
*Assistant Examiner*—N. D. Herkamp
*Attorney, Agent, or Firm*—Benasutti Associates, Ltd.

[57] ABSTRACT

An apparatus for automatically connecting battery plate units of adjacent cells through apertures in partitions between adjacent cell chambers of battery cases with said connection being effected by pressing lead projections of adjacent battery plate units together within each partition aperture and electrically fusing said projections together to form an electrical connection therebetween and completely fill said aperture and seal said chambers: comprising a work station in said apparatus where said plate units are connected, a conveyor for moving battery cases assembled with plate units into and from said work station, an electrode assembly comprising a pair of opposed electrodes adapted to fit into adjacent cell chambers and over said projections and apertures, indexing means for effecting relative movement of the battery case and electrode assembly at said work station for bringing the battery case into exact registry with the electrode assembly for effecting the connection, means for forcing said electrode assembly relatively toward each other against the projection and squeezingly pushing the projections into electrical contact within said aperture, means for supplying an electric current to said electrodes for effecting fusion of said lead projections within said aperture to form an internal connection between the adjacent lead projections and provide a complete sealing of the aperture between adjacent chambers, means for effecting relative movement between said electrode assembly and said battery case to additional positions whereby all of the connectors will be connected to all of the partitions containing apertures and provide a completed connection of said plate units in the overall battery.

34 Claims, 7 Drawing Figures

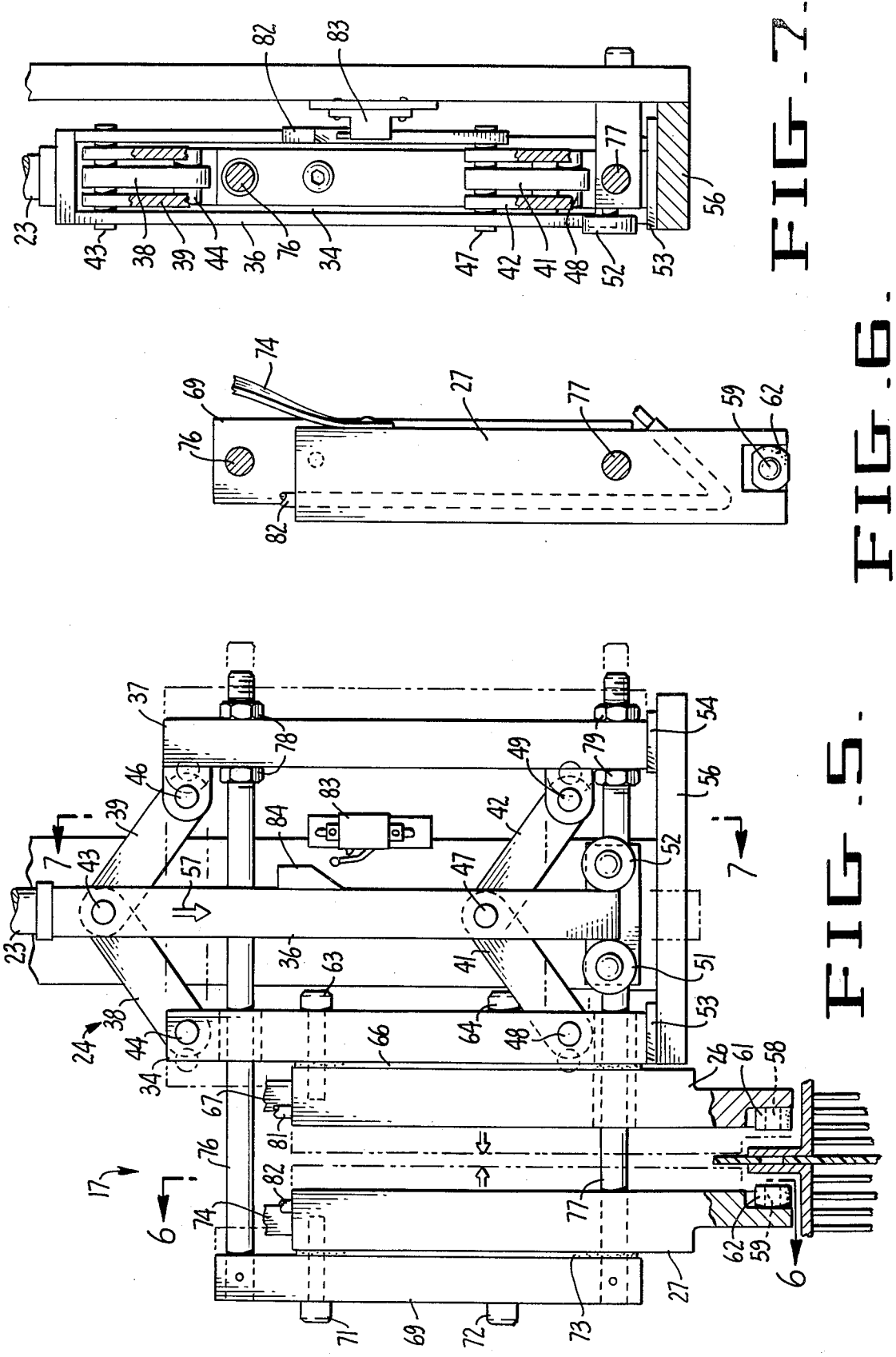

APPARATUS FOR FABRICATING THROUGH-THE-WALL BATTERY CONNECTORS

CROSS-REFERENCE TO RELATED APPLICATIONS

This application relates to an apparatus which is not only adapted to effect through-the-wall connections in general, but in its preferred form is adapted to perform the method described and claimed in our co-pending application Ser. No. 753,137 filed Aug. 16, 1968, and entitled, "Battery Connector for Lead Storage Batteries and Process for Making Same", and is a continuation-in-part of said copending application, and insofar as said early application contains subject matter of this invention, said prior application is incorporated herein by reference.

BACKGROUND OF THE INVENTION

The present invention relates to an apparatus for connecting battery plate units through apertures in battery cell partitions, and more particularly to an apparatus constructed for effecting each connection by fusing together lead projections within the apertures.

Lead storage batteries are well known and consist of a series of cells, usually three or six, connected in series to provide the desired output of voltage. Each cell consists of a plurality of positive and negative plates carried in electrolyte, with the positive plates being connected together by a battery strap at one side of the top of the plates and the negative plates being similarly connected together at the other side by another battery strap so as to provide parallel connections between the plates in each cell. In order to provide the desired series connection between cells, the plate units are lined up so that alternative positive and negative battery straps will appear on each side at the top of the plate units. Lugs or projections are provided on the straps and connection is effected by electrically joining these lugs or projections.

In early battery units each battery strap had a post projecting from the top of the battery casing and the connection between cells was made by an externally located strap. Later developments provided for placing such a strap internally just under the top of the battery casing. This provided for a saving in lead and a completely internal structure having obvious advantages. However, direct connection through the battery partitions provides even more advantages, such as short current path, lower resistance, less lead, etc. Considerable effort has been expended in providing the connections to the positive and negative battery straps directly through a partition in an efficient and reliable manner. However, it is considered necessary to utilize lead elements within the cells in order to resist corrosive conditions therein and it is particularly difficult to process lead in production machinery. In addition, it is important to provide a positive seal between cell units so that electrolyte cannot pass from one cell to another, and this seal should not require separate sealing materials such as epoxy resins.

It has been proposed to provide an aperture in each cell partition just above the battery straps to be connected and to provide a connector therethrough which in turn will be connected to each battery strap. For example, such connections have been made as indicated in U.S. Pat. No. 3,313,658 issued to Sabatino et al, Apr. 11, 1967. Other methods, such as that shown in our co-pending application referenced above, are preferred, but in any case it is desirable to provide an apparatus which is capable of accomplishing good fusion of the lead in the aperture and making a good completely sealed connection. Typically, such an apparatus consists of electrodes which are placed over the lugs and provided with a sufficient electric energy source to provide the burning or welding necessary. However, the cell spaces are rather small, and in a six cell battery five connectors must be welded. Accordingly, processing has been somewhat tedious and expensive and a need has arisen for a reliable machine capable of providing the connection in an automatic and reliable manner.

SUMMARY OF THE INVENTION

The apparatus of the present invention is designed to provide through-the-wall welding of battery connectors having lugs or projections especially designed for connection through apertures in battery cell partition walls. In its broad aspect, it will be appreciated that the apparatus of the present invention may be utilized in various of the known methods for providing said connection. However, it will be appreciated that the apparatus is preferably designed to provide a through-the-wall connection in which the lead is pushed or extruded into the aperture in the partition by the apparatus and fused together, the aperture being filled with lead thus extruded into the aperture from overlying projections of the battery connector straps, all as explained more fully in our said co-pending application.

Accordingly, it is a primary object of this invention to provide an apparatus capable of electrically connecting connector lugs through holes in partition walls of battery plate units in a reliable and efficient manner.

Another object of the invention is to provide an apparatus of the character described which is capable of operating automatically and completing all of the necessary through-the-wall connections for an entire battery unit reliably and rapidly.

A further object of the invention is to provide an apparatus capable of making connections through an aperture in a cell partition wall by a process of pushing lead from the connector lugs into the partitions and simultaneously fusing or welding the lead within the partition so as to completely fill the aperture and provide a sealed connection therein.

A still further object of the invention is to provide an apparatus of the character described which is capable of providing high clamping pressures on the connector lugs while fusing the lead together, and which is constructed to synchronize the welding operation and the clamping whereby the welding takes place during the optimum portion of the overall clamping cycle and a completely filled and absolutely reliable weld is obtained in a rapid and reliable manner.

Further objects and advantages of the invention will be apparent as the specification progresses, and the new and useful features of the apparatus for connecting the battery plate units through apertures in battery cell partitions will be more fully defined in the claims attached hereto.

In its broad aspect, the invention provides an apparatus for connecting battery plate units of adjacent cells through an aperture in a partition between adjacent cell chambers by effecting a complete joining and fusion of lead in projections carried on plate units of adjacent storage battery cells with said fused connections being effected through said aperture, whereby the lead of adjacent plate units is integrally and electrically connected. In general, the apparatus comprises an electrode assembly containing a pair of opposed electrodes formed to fit into said adjacent cell chambers and over said projections, means for forcing said electrodes in said electrode assembly relatively toward each other for forcing said plate unit projections electrically against each other within said aperture, means for providing an electric current in response to said electrode movement for fusing said lead in and at the aperture capable of providing a fused connection completely filling and sealing said aperture, an indexing means for effecting relative movement between said electrode assembly and said battery case to position the electrode assembly at each partition to be welded, and relating the operation of said indexing means with the operation of the electrode assembly so that each operation may be effected automatically in desired sequence.

In the preferred form, the electrodes are provided with special projections sized to push and deform portions of flat lugs or projections into the aperture and completely fill the aperture with such lead from the flattened projections or lugs overlying the aperture, all in accordance with the method of our co-pending application. The electrodes are carried by means formed to urge them relatively together at exceedingly high pressures so that the fused lead will be forced into position to completely fill the aperture and provide a complete seal while at the same time positively assuring an effective electrical and mechanical connection through the aperture. In the preferred battery construction utilizing the apparatus of this invention, the projections are formed with flat faces and an area larger than each aperture so that the projections will overlie the aperture with sufficient overlap that a certain amount of variation of position of the cell unit may be tolerated and still have each projection completely overlying the aperture. The electrodes are preferably held by strong electrode holders operatively connected to means for moving the holders relatively toward each other, all of which is provided in the electrode assembly. In this way, a rather strong clamping pressure is obtained on the projections through the electrodes.

In addition, as here shown, an auxiliary clamp is also used to squeeze the projections against partition around the apertures so as to assure a seal between the projections and the partition and to retain the lugs flat against the partition in the finished product. A preferred auxiliary clamp may simply be a yieldable plastic piece surrounding the electrodes and carried between the plate projections and the electrode holder, with sufficient yielding force that the auxiliary clamping pressure is exceeded by the clamping achieved through the electrodes. In its preferred form, the present apparatus provides for the welding or fusing operation to be rapidly carried out under carefully controlled conditions while the electrodes are maintained in their clamped condition after formation of the connection so that a good seal is provided in many cases without auxiliary clamping. j In prior through-the-wall constructions, one of the difficulties which occasionally occurred was the presence of bubbles in the welds, which caused physical weakness and in some instances outright failure of the connection. It is believed that the bubbles tend to form because of trapped air, and when utilizing the apparatus of the present invention, any air that might be trapped within the aperture is either substantially completely forced out of the area or tremendously compressed so as to produce a sound and bubble-free weld.

In accordance with a preferred form of the present invention, as the electrodes move into welding position, they deform the flat projections into the aperture in the partition. The peaks of the resulting bulges do not touch each other immediately, but at about the time the bulges make contact the electrodes are energized. The electrode movements cause the bulges to make sufficient connection that the crowns of the bulges melt and expel into any voids existing between the terminals and the partition hole. As the electrodes keep pressing more lead into the welding zone, all voids are filled in the partition hole and the whole weld area becomes a solid bubble-free mass. The means urging the electrodes, is then deenergized when their movement is at about the final position, but the electrodes are held in such position for a short time to permit the melted lead to solidify. Since the specific electric resistance of lead at room temperatures is about $20.6 \times 10-6$ ohms per centimeter, and at about 330° C. (melting point of lead) it is about $96 \times 10-6$ ohms per centimeter, and higher at higher temperatures, selective melting at the desired melting zone is very much expedited.

When utilizing the apparatus in this preferred procedure where lead is extruded into the aperture, the apparatus achieves the welded or fused connection as follows. The contact area of the two bulges is relatively small and therefore the resistance is very high at the starting point. This area will immediately melt, and, through the advancing lead extrusion, will be squeezed into this surrounding space. Since this is hot or liquid lead, resistance is very high, and the whole area will melt together very easily. At the same time substantially all of the electric current flow will pass through the aperture and substantially no melting of the projection remote from the aperture will occur. Since the entire welding operation is a very brief duration, preferably from one-twelfth second to one-half second, the remainder of the projections will provide a heat sink to allow rapid solidification as soon as the electrodes are deenergized.

Although considerable explanation has been given for the welding operation for each connection, it will be appreciated that this apparatus will provide for all of the connections to be similarly made for an entire battery. Preferably, the battery will be a six cell unit and five connections will need to be made. Accordingly, the apparatus is constructed to provide accurate indexing or alignment of the electrodes with the apertures of the battery case so that the welding operation will occur at exactly the right point. In other words, although some freedom may be allowed for the placement of the plate units where the plates have flat projections to be extruded, it will be appreciated that the electrodes and the extrusions achieved thereby will necessarily be accurately aligned with the aperture.

Thus the apparatus provides for a conveyor for moving the battery cases containing plate units into and from a station in said apparatus where the connections are made, and indexing means for effecting relative movement between the battery case and the electrode assembly at each station into exact registry for effecting each connection. In one form of the invention, the electrode assembly comprises two electrodes which are moved relatively vertically with respect to the battery case, and transversely when moving from one connection to the next while the battery case is advanced a distance equivalent to one cell width, so that the staggered connections may be indexed and made as more clearly described below.

Automation may be achieved by any simple time sequencing device, but is preferably achieved by a suitable control system programming the sequence of timed events so as to positively assure step-by-step processing. Such time sequencing control mechanisms are well known, and therefore it is not deemed necessary to explain its use in detail. However, the apparatus of this invention is preferably constructed with the various units moved into welding position by air cylinders, and the preferred time sequencing device is a fluid control system designed to assure the proper sequence of the operation of these air cylinders.

BRIEF DESCRIPTION OF THE DRAWING

The preferred forms of the invention are illustrated in the accompanying drawing forming a part of this description, in which:

FIG. 5, an enlarged fragmentary elevational view of a portion of the electrode assembly of the machine of FIG. 1;

FIG. 6, a sectional view of the electrode assembly illustrated in FIG. 5 as seen substantially in the plane of line 6—6 thereof; and FIG. 7, a sectional view of another portion of the electrode assembly of FIG. 5, substantially as seen in plane of line 7—7 thereof, but with the battery omitted.

Figures 1, 2:
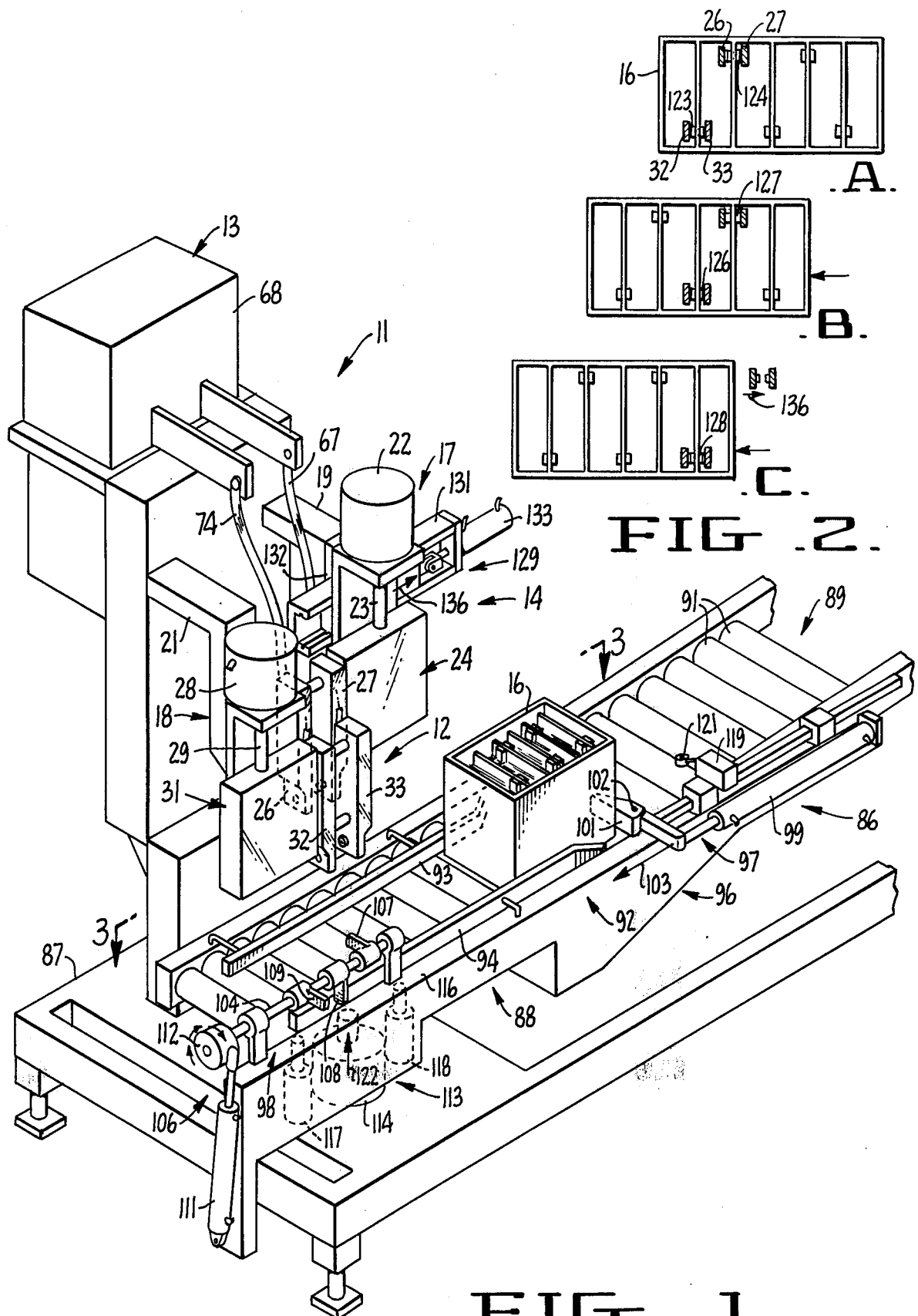
FIG. 1, is a perspective view of a preferred form of apparatus constructed according to the invention.
FIG. 2, a diagrammatic plan view showing a battery case and the electrodes of the machine in FIG. 1 in the positions for making the connections in a six cell battery.
Figure 3:
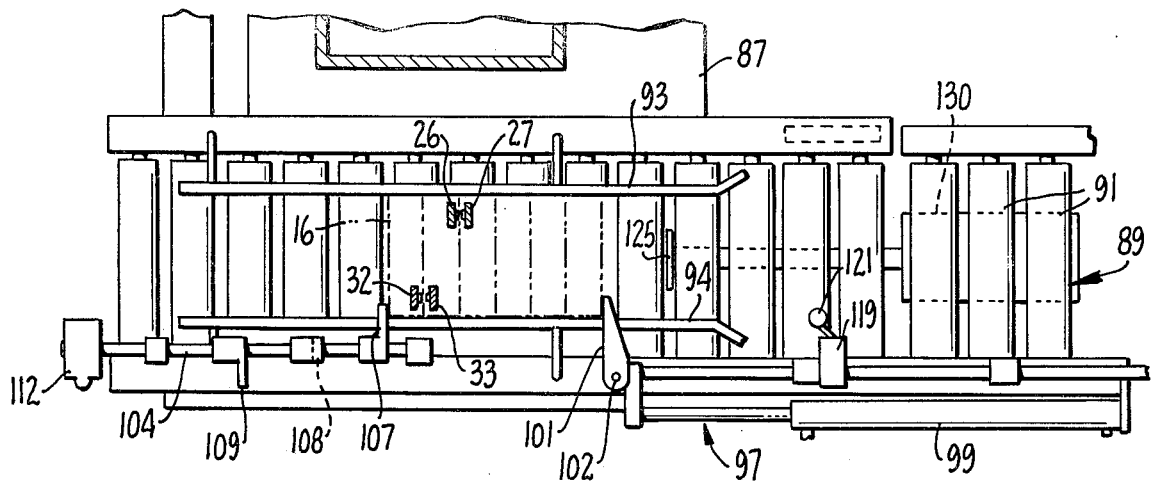
FIG. 3, a plan view of the machine partly in section substantially seen from the plane of line 3—3 of FIG. 1.

While only a preferred form of the invention has been shown, it should be understood that various changes and modifications may be made within the scope of the claims attached hereto without departing from the spirit of the invention.

DETAILED DESCRIPTION OF THE PREFERRED EMBODIMENT

Referring to the drawings in greater detail, the apparatus 11 of the present invention includes an electrode assembly 12, means 13 for providing electric current to said electrode assembly, and indexing means 14 for effecting relative movement between said electrode assembly and a battery case 16.

As may be seen in FIG. 1, the electrode assembly 12 provides two similar electrode systems 17 and 18 mounted on sub-frame members 19 and 21 respectively. The electrode system 17 includes an air cylinder 22 having a connecting rod 23 connected to a linkage 24 which in turn is operatively connected to a pair of electrode holders 26 and 27. Similarly, electrode system 18 includes an air cylinder 28 having a connecting rod 29 connected to a linkage 31 which in turn is operatively connected to electrode holders 32 and 33. The linkage and electrode holders of electrode systems 17 and 18 are similarly constructed, the linkage 24 of electrode holder 17 being more clearly shown in FIG. 5.

As there shown, the linkage 24 comprises three parallel arms 34, 36 and 37 connected together through links 38, 39, 41 and 42. Thus links 38 and 39 are pivotally attached to one end thereof to arm 36 at 43, with the other end of link 38 being attached to arm 34 at 44, and the other end of link 39 being attached to arm 37 at 46. Similarly links 41 and 42 are pivotally attached at one end to arm 36 at 47, with link 41 having its other end pivotally attached to arm 34 at 48 and link 42 having its opposite end attached to arm 37 at 49.

Arm 36 is attached to connecting rod 23 of air cylinder 22 and is limited at its other end by roller bearings 51 and 52 so as to be free to move vertically, upward and downward with connecting rod 23 as air cylinder 22 is operated. In addition to roller bearings 51 and 52, slide bearings 53 and 54 are provided to restrain arms 34 and 37 against downward movement. Bearings 53 and 54 are carried on a floor 56 which is suitably carried on sub-frame member 19.

Thus in operation, the air cylinder 22 causes arm 36 to move downward as indicated by arrow 57 but arms 34 and 37 are restrained against downward movement by bearings 53 and 54. Thus links 38, 39, 41 and 42 are caused to extend more perpendicularly with respect to the arms and cause arms 34 and 37 to spread relatively apart. On reverse movement of the air cylinder 22, the linkage returns to the position shown and arms 34 and 37 retract back to their original position.

The electrode system 17 comprises the pair of electrode holders 26 and 27 each carrying an electrode 58 and 59, with a pair of polyurethane bushings 61 and 62 surrounding each electrode. Electrode holder 26 is securely attached to arm 34 by means of bolts 63 and 64, with said attachment being effected in an electrically insulated fashion. In other words, a phenolic insulating strip 66 is interposed between the electrode holder 26 and arm 34 and the bolts are electrically insulated through suitable insulated washers so as to prevent electric current flow from taking place between the electrode holder and arm 34.

Electrode holder 26 is equipped with a cable 67 that leads to a suitable welding transformer carried in box 68 (see FIG. 1). Electrode holder 27 is secured to auxiliary arm 69 through bolts 71 and 72, and this attachment is also made in an electrically insulated fashion by means of a phenolic insulating strip 73 with suitable insulation on the bolts. Electrode holder 27 also has a transformer cable 74 which leads to the transformer serving cable 82. The auxiliary arm 69 is securely connected to arm 37 by a pair of connecting rods 76 and 77 so that the movement of auxiliary arm 69 is on the opposite side of arm 34. However, since auxiliary arm 69 is on the opposite of arm 34 it is seen that the movement causing arms 34 and 37 to move relatively apart will cause auxiliary arm 69 and arm 34 to move relatively together. In this way, the electrode holders 26 and 27 and their associated electrodes 58 and 59 will be brought relatively together upon operation of the air cylinder and linkage mechanism.

It will be appreciated that the electrode spacing should be securely adjusted to provide the desired spacing of the electrodes at their final position. This adjustment is achieved by the setting of nuts 78 on connecting rod 76 and nuts 79 on connecting rod 77. If desired, electrode holders 26 and 27 are cooled by passing heat exchange fluid through passages therethrough.

It is also important to synchronize the motion of the linkage and corresponding movement of the electrodes with the application of electrical energy through the electrodes so that the welding or burning current may be applied at the right time and assist in melting the lead within the aperture prior to complete clamping so that the lead is under pressure within the aperture and an excellent sealed connection is obtained. As here shown, the energy is applied at the proper time by actuation of switch means 83 mounted on frame 19 in position to be operated by actuator 84. The switch means is adjustable so that the actual tripping of the switch may be synchronized exactly with respect to the downward movement of arm 36 and with the clamping effect of the electrodes, which is linked to the movement of arm 36 as explained.

Although a switch mechanism is shown for supplying welding current from the transformer located in box 68 through cables 74 and 67, it will be appreciated that the circuit may also be closed by the contacting of the lug bulges themselves. In other words, cables 67 and 74 may be energized from the transformer, but no current will flow between the electrodes because the circuit is open. Then as the electrodes move and press the projections, contact is made and welding begins. The welding is preferably timed and the time of the air cylinder 22 is also adjusted so that the desired duration of welding will take place and be completed prior to the final squeezing effect of the clamping mechanism.

When no switch is used, the timing is started with a suitable monitor such as a current sensing device or voltage sensing device, which starts a clock mechanism that in turn shuts off the supply of electric current. When a switch is utilized, it usually is adjusted to turn on just after the bulges contact and, in such a case, the switch will also turn on the desired timing device.

Electrode system 18 is similarly constructed to electrode system 17, and its linkage system 31 operates electrodes 32 and 33 in the same way that electrodes 26 and 27 of electrode system 17 are operated. Accordingly, this mechanism is not shown in detail, nor is a detailed description of its operation necessary. However, it will be noted that the electrodes 32 and 33 of electrode system 18 are energized by the current source in box 68, which current source also energizes the electrode of system 17. The welding operations are effected in tandem or timed sequence with one of the air cylinders 22 and 28 first, and then the other. It will be appreciated, that either of the cylinders may operate first, since both welding operations are similarly carried out. Accordingly, the control system which actuates the air cylinders is sufficient to initiate the welding step as described, and only the operation of the air cylinders need be indexed with the positioning of the battery to constitute the indexing means 14.

It will be appreciated that the battery must be exactly located with respect to the electrodes so that the electrodes will be in exact alignment with the aperture and partition through which the weld is to be made. Thus in its broad aspect, the battery could be positioned horizontally by hand against suitable guide means, and then moved with respect to the electrodes to an exact vertical positioning whereupon the welding could take place. The battery would then be moved vertically with respect to the electrodes and positioned in the next welding station and such positioning continued until all of the welds are made.

However, in the preferred form of the apparatus, the battery is conveyed into position by a conveyor 86 positioned on frame 87, with the frame 87 also carrying sub-frame members 19 and 21 and the electrode assembly 12 already described. Conveyor 86 comprises a work station 88 and a feed section 89 serving as means for conveying a battery case 16 into work station 88. These conveyor sections may be any typical conveyor sections suitable for moving battery cases therealong.

As here shown, section 88 and 89 comprise a plurality of rollers 91 capable of supporting and moving the battery in the desired direction. Conveyor 86 also includes means for accurately positioning the battery case 16 transversely to the axis of movement, and this positioning means is generally indicated as means 92. The means 92 here comprises a pair of guide rails 93 and 94, which are spread open at the receiving end and then accurately spaced to index the battery transversely in the work station 88 and to guide the partition aperture in exact transverse alignment to the electrode systems 17 and 18. Conveyor 86 further includes means 96 for positioning the battery axially with respect to the conveyor for assuring exact alignment with the electrodes.

Means 96 comprises a pusher 97 acting in concert with stop means 98. Pusher 97 consists of an air cylinder 99 operating a spring loaded pusher member 101, which is pivoted at 102 to allow a battery case to move therepast. After the battery case passes, the pusher springs back into the position shown, so as to engage and push the battery case through work station 88, as indicated by arrow 103, in accordance with the operation of air cylinder 99.

Stop means 98 comprises a shaft 104, means 106 for rotating shaft 104, and a plurality of radially extending stop members 107, 108 and 109 carried on the shaft and rotatable therewith for movement into and out of the appropriate stop position. Means 106 comprises an air cylinder 111 operative to actuate a suitable gear sytem 112 on axial positioning thereof so as to position shaft 104 in any one of four positions. These four positions include the position shown with stop 107 in position to stop a battery, a 90° rotation placing stop 108 in such position and moving 107 out of position, a further 90° rotation placing stop 109 in position, and a further 90° rotation or a reverse movement of 270° rotation to place the mechanism in position so that no stop will impede the movement of the battery. In this way, the battery may be positioned accurately axially in three different welding positions, and thence pushed through the apparatus to a take off conveyor (not shown).

From the foregoing description, it is seen that the conveyor accurately registers the battery in vertical position directly under the electrode means. In order to then bring the electrodes and battery into vertical alignment, means 113 is provided. It will be appreciated that the electrodes could be moved downward, or the battery could be moved upward, but it is preferred to move the battery upward by moving the entire work station 88 upward and means 113 effects this movement. Thus means 113 comprises air cylinder 114 bearing against frame 116 of work station 88 to force upward movement of the same, and guides 117 and 118 are provided to maintain accurate positioning during said upward movement, with the final position of the cylinder being adjusted to exact vertical alignment of the aperture with the electrodes.

In operation of the machine shown in FIGS. 1 through 7, the battery case 16 moves along feed section 89 of conveyor 86 on top of rollers 91. The battery case 16 moves into engagement with a holding means 119 having an upwardly movable arm 121 tied in with the operation of pusher 97 so that it will be raised by cylinder 120 to hold back additional batteries after one battery is passed and until such battery has been pushed on through the work station. In this way, only one battery at a time is allowed to enter the work station. When pusher 101 reaches the end of its stroke, cylinder 120 retracts stop 125 to permit the next battery to pass to the work station and this causes a brake pad 130 to press against rollers 91 and hold back the row of batteries. As soon as the battery clears stop 125, the cylinder moves stop 125 upwardly to intercept the next battery. This action draws brake pad 130 downwardly to permit the next battery to advance to stop 125.

Figure 4:
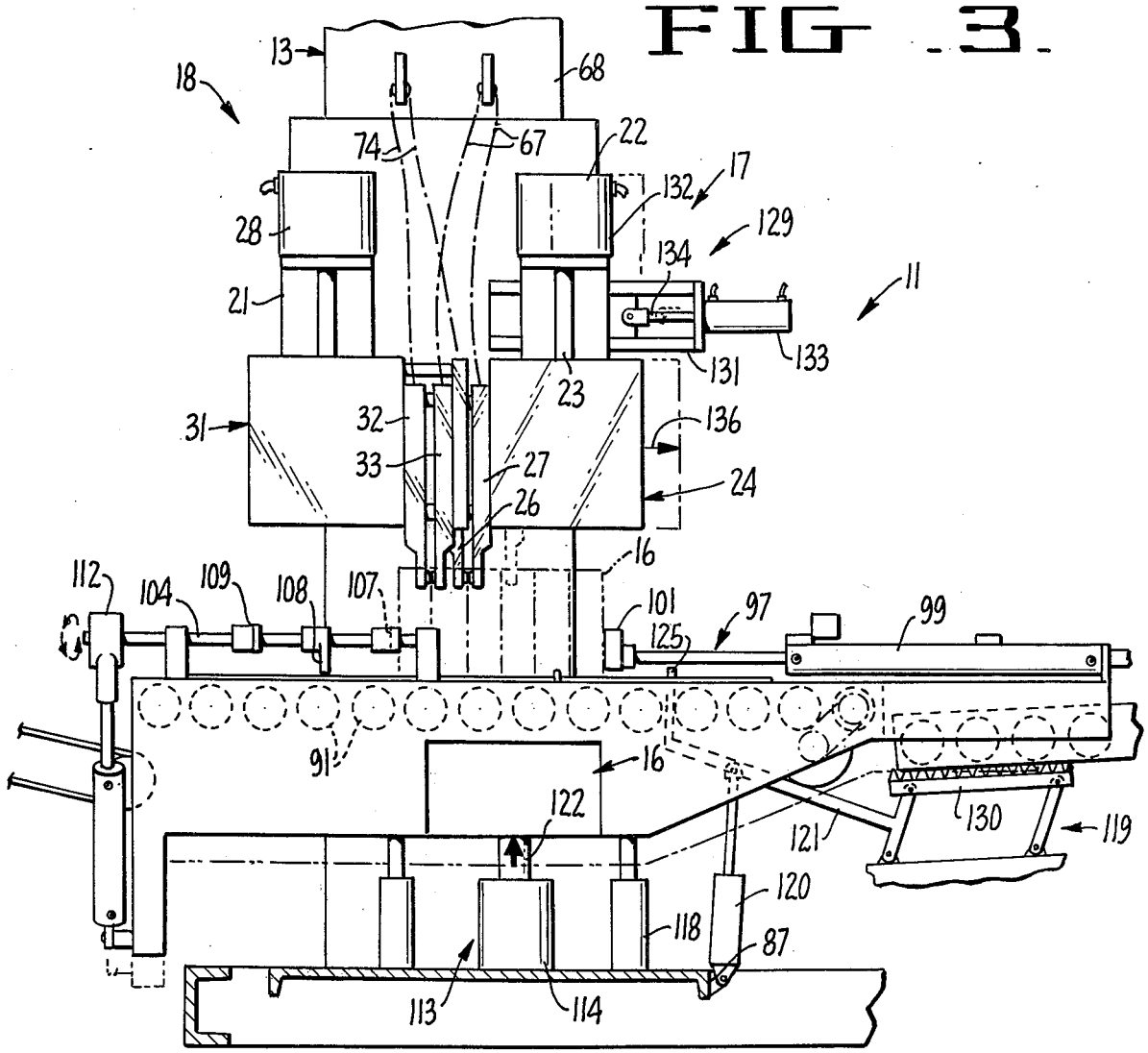
FIG. 4, a front elevational view of a major portion of the machine shown in FIG. 1.

With the work station clear as shown, battery 16 then moves past pusher member 101, which springs back into the position shown in FIG. 1 and then pushes the battery toward stop 107. When the battery arrives in the first position in contact with stop member 107, as shown in FIG. 4, air cylinder 114 is operated to move the battery case 16 from the position shown in solid lines in FIG. 4 to the welding position shown in phantom in FIG. 4. Said movement is achieved by moving the entire conveyor section 88 at the work station upwards as indicated by arrow 122 with the battery in the position shown. The electrodes are now in the position in FIG. 2A, and welding takes place at these two partitions as described above in connection with the operation of the electrode assembly. In this way, welds are made at 123 and 124.

After these welds are made, air cylinder 114 is operated to lower the work station, air cylinder 111 is operated to move stop 107 out of position and simultaneously move stop 108 into position, and air cylinder 99 continues its operation to move pusher 102 and push the battery case against stop 108. With the battery case thus moved, air cylinder 114 is again operated to bring the battery case vertically upwards so that the electrode pairs are positioned at 126 and 127 as shown in FIG. 2B. With the electrodes thus placed, each electrode pair is then operated to produce a weld so that the connecting lugs are welded at 126 and 127. After these welds are effected, air cylinder 114 is retracted, cylinder 11 is operated to move stop 108 out of position and to move stop 109 into position, and the battery case is pushed against stop 109 by pusher 97.

At this position in the welding operation, it will be appreciated that only one more weld needs to be made and that this weld will be made by electrodes 32 and 33 of electrode system 18. Since electrodes 26 and 27 might come in contact with the end of the battery case in normal lifting, provision is preferably made to move these electrodes laterally out of the way.

Referring particularly to FIGS. 1 and 4, it is seen that electrode system 17 is mounted on a slide 129 which in turn is mounted on sub-frame member 19. Slide 129 comprises a U-shaped channel member 131 adapted to carry a frame 132 on which the electrode 17 is mounted. Frame 132 is slidably mounted in the channel member 131 and positioned therein by air cylinder 133. Air cylinder 133 is a two position cylinder operating a connecting rod 134 and frame 132 so as to move electrode system 17 from the position shown in the drawings to an out-of-the-way position, as shown in phantom in FIG. 4, by lateral movement, as indicated by arrow 136.

With the electrode system 17 thus out of the way, air cylinder 114 operates to lift the work section 88 and battery case 16 to position electrodes 32 and 33 at 128 as shown in FIG. 2C, and with electrodes 26 and 27 in an out-of-the-way position. With this position achieved, the electrodes 32 and 33 are operated to provide the desired connection as in the other welding steps. After the weld is completed, the work section 88 is lowered, air cylinder 111 operated to move stop means 109 out of the way, and the battery pushed onto a roller conveyor for further processing. After the pusher has reached the end of its stroke, it is automatically retracted and stop 121 of holding means 119 is retracted to allow the next battery case to move into the work section.

In this way, all five welded connections of each battery case occur with the machine operating in sequential fashion. It will be appreciated that this sequencing could be achieved by any suitable control means such as a rotary clock switch for effecting such sequence of events, but we prefer to use a fluid programming system which provides the desired sequence of controls in a reliable and rapid manner. Such fluid logic controls are well known and available in the trade.

From the above description, it is seen that an apparatus is provided which is capable of making through-the-wall connections of battery plate lugs where the walls are provided with apertures to receive said connections. It is also seen that a machine is provided which is capable of the accurate indexing required in order to exactly position the electrodes, and a machine is also provided which is capable of providing the desired clamping pressure during the welding operation with all of the various operations being machine controlled so as to be capable of automation by simple sequencing of the operative steps.

We claim:

1. An apparatus for connecting battery plate units positioned in adjacent cell chambers of a battery case, through an aperture in a partition between said adjacent cell chambers by extruding and fusing the lead of projections carried on said plate units through said aperture, comprising:
   a. an electrode assembly means comprising a pair of opposed electrodes adapted to fit about said partition and into said adjacent cell chambers and overlie said projections, said electrodes being configured and dimensioned relative to said aperture to extrude a portion of each of said projections into said aperture;
   b. means for moving said electrodes relatively toward each other for forcing said plate unit projections against said partition and for extruding a portion of each of said projections into said aperture and into contact with each other within said aperture; and
   c. means for passing an electric current through said electrodes for fusing said lead in and at the aperture and forming an intercell connection between said plate units and said cells.

2. The invention of claim 1 further comprising: indexing means for effecting relative movement between said electrode assembly means and said battery case to position the electrode assembly means at each partition to be welded through in synchronism with the operation of the electrode assembly means so that each operation may be effected automatically in sequential relation.

3. An apparatus for connecting battery plate units as defined in claim 2, in which the indexing means comprises
   a conveyor having a work station formed for receiving a single battery case and conveying it horizontally into an exact position underneath the electrode assembly means, and
   means for effecting exact relative vertical movement for positioning the battery case vertically with respect to said electrode assembly means whereby the electrodes are exactly positioned over overlying the aperture at the welding position.

4. An apparatus for connecting battery plate units as defined in claim 3, in which means is provided on the conveyor to prevent more than one battery at a time from being moved into the work station.

5. An apparatus for connecting battery plate units as defined in claim 3, in which the battery case is adjusted in longitudinal movement by a pair of guide members formed to receive the battery case and position same in a desired lateral alignment.

6. An apparatus for connecting battery plate units as defined in claim 3, in which means is provided for exactly positioning the battery case along the length of the conveyor, said means comprising a pusher member for pushing the battery case in said longitudinal direction, and a stop member for positively stopping the battery case in the exact position, with said pusher and said stop member providing sufficient force to positively assure exact positioning of the battery case.

7. The invention of claim 1 further comprising:
   a. a work station in said apparatus where said connections are made;
   b. a conveyor for moving battery cases containing plate units into and from said station;
   c. means formed for effecting relative movement of the battery case and electrode assembly means at said station into exact registry for effecting the connection; and
   d. means for effecting relative movement between said electrode assembly and said battery case to additional positions whereby all of the connectors are connected through all of the partitions containing apertures to provide a completed connection of said plate units in the overall battery.

8. An apparatus for connecting battery plate units as defined in claim 7, in which the electrode assembly means comprises two pairs of opposed electrodes carried in spaced relation for overlying two pairs of adjacent projections of battery plate units whereby two connections may be made at each position of registry.

9. An apparatus for connecting battery plate units as defined in claim 8, in which vertical movement is effected by means for elevating the entire work station and battery case an amount sufficient to provide vertical alignment with the electrode assembly means.

10. An apparatus for connecting battery units as defined in claim 9, in which means is provided on the conveyor for assuring that only one battery case is moved into the work station at a time.

11. An apparatus for connecting battery units as defined in claim 10, in which the conveyor is provided with guide means for positioning the battery case along an exact desired path within the work station for vertical alignment with the electrode assembly means.

12. An apparatus for connecting battery units as defined in claim 11, in which pusher means are provided to push the battery case through the guide means at the work station, and stop means is provided to stop the movement of the battery case at the desired position on the path of movement thereof for each welding operation.

13. An apparatus for connecting battery plate units as defined in claim 11, in which the stop means is provided with three stop positions and a through position whereby the battery is indexed into three separate welding positions for making connections through a first partition at one stop position and then a second partition then making connections through a third partition and then a fourth partition at a second stop position, and finally making a connection through a fifth partition at a third stop position.

14. An apparatus for connecting battery plate units as defined in claim 13, in which the battery case is brought into welding position by means for moving the work station vertically.

15. An apparatus for connecting battery plate units as defined in claim 13, in which one of the two pairs of opposed electrodes is mounted on a slide and comprises means for moving said pair of electrodes in an out-of-the-way position when a single weld is being effected.

16. An apparatus for connecting battery plate units as defined in claim 7, in which the electrode assembly means contains a pair of opposed electrodes, and in which means are provided to move said pair of electrodes between two lateral positions.

17. An apparatus for connecting battery plate units as defined in claim 16, in which the conveyor is provided with guide means for positioning the battery case along an exact desired path within the work station for providing exact vertical alignment of the apertures in the battery case with said electrodes.

18. An apparatus for connecting battery units as defined in claim 17, in which pusher means are provided to push the battery case through the guide means at the work station, and stop means is provided to stop the movement of the battery case at the desired position on the path of movement thereof for each welding operation.

19. An apparatus for connecting battery plate units as defined in claim 18, in which the stop means is provided with five stop positions for placing each of the five partitions of a six cell battery case under said electrodes, and a sixth position for allowing the battery case to move on through the work station.

20. An apparatus for connecting battery plate units as defined in claim 7, in which the electrode assembly means contains a plurality of pairs of electrodes.

21. The invention of claim 1 further comprising:
   a. linkage means for forcing said electrodes in said electrode assembly means relatively toward each other for forcing said plate unit projections electrically against each other within said aperture;
   b. said linkage means comprising: a first member mounted for axial movement; a second and third member restrained against axial movement and positioned substantially parallel to said first member; links connecting said second and third member to said first member whereby axial movement of the first member causes a change in distance between said second and third members; and powered means for axially moving said first member;

c. said electrode assembly means also comprising a pair of electrode holders connected to said second and third members of said linkage means whereby powered axial movement of said first member caused said electrode holders to move relatively toward each other, with said electrodes being mounted on said electrode holders for movement therewith;

d. means for providing an electric current in synchronous relation with said electrode movement for fusing said lead in and at the aperture capable of providing a fused connection completely filling and sealing said aperture; and e. indexing means for effecting relative movement between said electrode assembly means and said battery case to position the electrode assembly at each partition to be welded through and synchronizing said indexing means with the operation of the electrode assembly means so that each operation may be effected automatically in sequential relation.

22. An apparatus for connecting battery plate units as defined in claim 21, in which the indexing means comprises a conveyor having a work station formed for receiving a single battery case and conveying it into an exact position underneath the electrode assembly means, and means for effecting exact relative movement for positioning said battery case vertically with respect to said electrode assembly means whereby the electrodes are exactly positioned overlying the aperture at the welding position.

23. An apparatus for connecting battery plate units as defined in claim 22, in which means is provided on the conveyor to prevent more than one battery from being moved into the work station at a time.

24. An apparatus for connecting battery plate units as defined in claim 23, in which the battery case is adjusted in axial movement by a pair of guide members formed to receive the battery case and position same in a desired axial direction.

25. An apparatus for connecting battery plate units as defined in claim 24, in which means is provided for exactly positioning the battery case along the path of the conveyor, said means comprising a pusher member for pushing the battery case in said axial direction, and a stop member for positively stopping the battery case in the exact position, with said pusher and said stop member providing sufficient force to positively assure exact positioning of the battery case.

26. The invention of claim 1 further comprising:

a. a work station in said apparatus where said connections are made;

b. a conveyor for moving battery cases containing plate units into and from said station;

c. indexing means for effecting relative movement of the battery case and electrode assembly means at said station into exact registry for effecting the connection;

d. linkage means for forcing said electrodes of said electrode assembly means relatively toward each other and against the projection to squeezingly push the projections into electrical contact within said aperture;

e. said linkage means comprising; a first member mounted for axial movement; a second and third member restrained against axial movement positioned substantially parallel to said first member; links connecting said second and third member to said first member whereby axial movement of the first member causes a change in distance between said second and third members; and powered means for axially moving said first member;

f. said electrode assembly means also comprising a pair of electrode holders connected to said second and third members of said linkage means whereby powered axial movement of said first member causes said electrode holders to move relatively toward each other, with said electrodes being mounted on said electrode holders for movement therewith;

g. means for supplying an electric current to said electrodes for effecting a fusion of said lugs within said aperture to form an integral connection between the adjacent lead projections and provide a complete sealing of the aperture between adjacent chambers; and h. means for effecting relative movement between said electrode assembly means and said battery case to additional positions whereby all of the connectors will be connected through all of the partitions containing apertures and provide a completed connection of said plate units in the overall battery.

27. An apparatus for connecting battery plate units as defined in claim 26, in which the electrode assembly means contains two pairs of opposed electrodes carried in spaced relation for overlying two pairs of adjacent projections of battery plate units whereby two connections may be made at each registered position.

28. An apparatus for connecting battery plate units as defined in claim 27, in which vertical movement is effected by means for elevating the entire work station and battery case an amount sufficient to provide vertical alignment with the electrode assembly means.

29. An apparatus for connecting battery units as defined in claim 28, in which means is provided on the conveyor for assuring that only one battery case is moved into the work station at a time.

30. An apparatus for connecting battery units as defined in claim 29, in which the conveyor is provided with guide means for positioning the battery case along an exact desired axis within the work station for vertical alignment with the electrode assembly means.

31. An apparatus for connecting battery units as defined in claim 30, in which pusher means is provided to push the battery case through the guide means at the work station, and stop means are provided to stop the movement of the battery case at the desired position on the path of movement thereof for each welding operation.

32. An apparatus for connecting battery plate units as defined in claim 31, in which the stop means is provided with three stop positions and a through position whereby the battery is indexed into three separate welding positions for welding two partitions at a first stop position, then welding two more partitions at a second stop position, and finally welding another partition at the third position.

33. An apparatus for connecting the battery plate unit as defined in claim 32, in which the battery case is brought into welding position by means for moving the work station vertically.

34. An apparatus for connecting the battery plate unit as defined in claim 33, in which one of the two pairs of opposed electrodes is mounted on a slide and comprises means for moving said pair of electrodes in an out-of-the-way position when a single weld is being effected.

* * * * *